United States Patent

[11] 3,556,486

| [72] | Inventor | Vincent J. Rutkauskas |
| | | Pasco, Wash. |
| [21] | Appl. No. | 797,612 |
| [22] | Filed | Feb. 7, 1969 |
| [45] | Patented | Jan. 19, 1971 |
| [73] | Assignee | The United States of America as represented by the United States Atomic Energy Commission |

[54] COMBINATION LINEAR LIFTING AND TRANSLATION MECHANISM
5 Claims, 2 Drawing Figs.

[52] U.S. Cl.......................................................... 254/135, 212/55, 254/150
[51] Int. Cl.......................................................... B66d 1/00
[50] Field of Search............................................. 254/150, CDFP; 212/55; 182/41

[56] References Cited
UNITED STATES PATENTS
1,465,182   8/1923   Sago............................ 182/41
FOREIGN PATENTS
30,198   6/1964   Germany...................... 254/(CDFP)
361,898            Switzerland................... 212/55

Primary Examiner—Evon C. Blunk
Assistant Examiner—Alfred N. Goodman
Attorney—Roland A. Anderson ABSTRACT: A laboratory manipulator for the remote handling of objects in a controlled environment. A plurality of blocks are attached to one side of a flexible band. One end of the band is attached to a rotatable drum and a gripping means is attached to the other end of the band.

PATENTED JAN 19 1971  3,556,486

INVENTOR.
Vincent J. Rutkauskas
BY

COMBINATION LINEAR LIFTING AND TRANSLATION MECHANISM

The invention described herein was made in the course of, or under, a contract with the U.S. ATOMIC ENERGY COMMISSION.

This invention relates to a device for handling objects in an environment which is too hazardous to permit direct access. Such an environment may result from radioactivity or caustic chemicals.

Some of the requirements of such a device are that it be adaptable to remote control, it must be very dependable, it must be trouble free and it should have few moving parts. When the environment is a caustic chemical such as sodium there can be no electrical units in direct contact with the environment.

The device employs a rotatable drum to which a flexible band is attached. A plurality of blocks are affixed to one side of the flexible band and a gripping means such as a hook is attached to the free end of the flexible band. A means to confine the flexible band and blocks next to the drum consists of a pivot arm extending from the axis of the drum and a roller at the end of the pivoted arm that holds the flexible band and blocks against the drum and yet allows it to roll freely.

An object of this invention is to provide a laboratory manipulator in a controlled environment. A further object of this invention is to provide a trouble free and dependable laboratory manipulator. A still further object of this invention is to provide a laboratory manipulator that employs few moving parts and is simple and inexpensive to build and operate.

Other objects and advantages of the present invention will be made apparent from the accompanying drawings which are hereby made a part of this specification.

Figure 1:
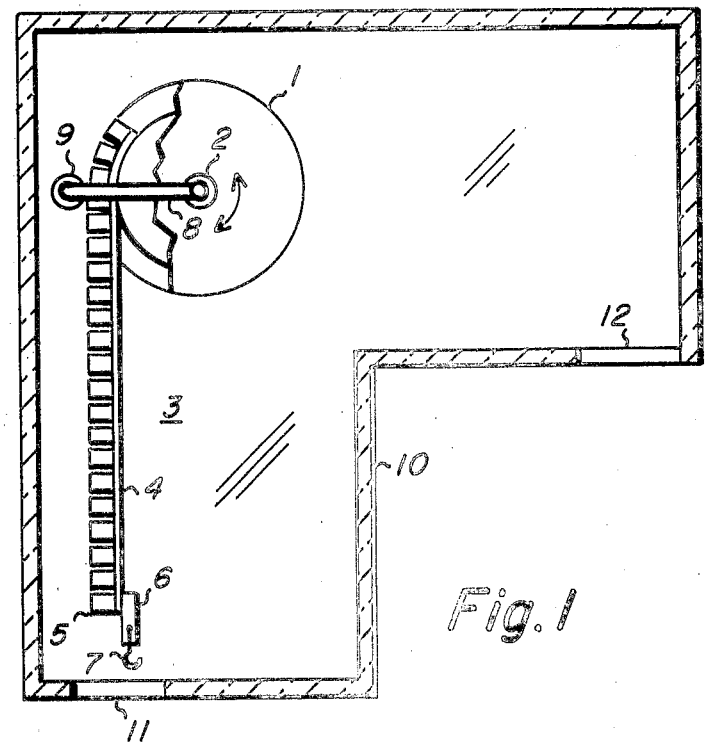
FIG. 1 is a side view of the device with the confining arm in the horizontal position allowing the flexible band to be moved up and down.

As shown in FIG. 1, the drum 1 is supported on a shaft or axle 2 to which a crank or motor mechanism (not shown) for controllable rotation of the drum may be attached. An articulated member is indicated in general at 3. It consists of a flexible band 4 to which are attached in adjacent relation a plurality of blocks 5. The articulated member has a length related to the horizontal distance through which an article is to be translated. If the vertical length of travel is greater than the desired horizontal travel, the band 4 is extended beyond the upper end of the articulated portion a sufficient length to provide the desired vertical length. A gripping means is attached to the free end of the articulated member. It is shown as an attachment piece 6 and a hook 7 pivotably attached to the attachment piece 6.

The articulated member confining means comprises rotatable wheel 9 and pivoted arm 8. The arm 8 is attached to the rotating drum shaft 2 and adapted for movement from the horizontal position shown in FIG. 1 to the vertical position shown in FIG. 2.

Figure 2:
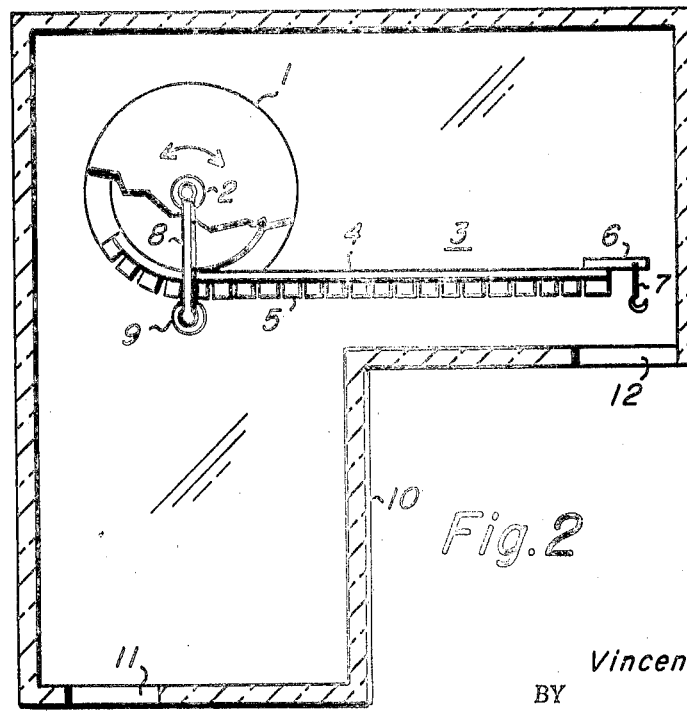
FIG. 2 is a side view of the device with the confining arm in the vertical position allowing horizontal movement of the flexible arm.

With the arm 8 in the position shown by FIG. 2 the articulated member may be extended in the horizontal direction moving an object laterally.

The device may be operated in a controlled environment established within enclosure 10. Objects may be introduced and removed through ports 11 and 12 by means of an air lock or other means the description of which will not contribute to the understanding of this invention. The only part of the device that extends outside of the enclosure 10 is shaft 2. Shaft 2 may be a coaxial device with the outside portion controlling the movement of pivoted arm 8 and the inside portion controlling the movement of the rotatable drum 1.

Shaft 2 is rotated clockwise to lower gripping means 7 to the depth needed to pick up an object such as a small pot of molten sodium from an induction furnace, and then rotated counterclockwise to raise the object. Next, arm 8 is rotated to a downward vertical position and temporarily locked in this position. Clockwise rotation of drum 1 causes the articulated member to move horizontally as shown in FIG. 2 to convey the pot of sodium to a pickup device. The operation is reversed to reestablish the depending position of the articulated member to enable repetition of the operation.

The device is useful in the remote handling of hazardous materials such as radioactive metals. The few moving parts and the dependable nature of these moving parts protect the device from malfunction. This is important when conditions make repairs difficult and spilling or misplacement must be avoided. The above considerations are also important when materials that may introduce corrosion to the moving parts are encountered.

I claim:

1. A combination lifting and translation device comprising an elongated articulated member consisting of a flexible band to which is attached in adjacent relation a plurality of blocks, and said member having arcuate flexibility in one direction from a linear condition and rigidity in all other directions from said linear condition, a rotatable drum to which one end of the articulated member is affixed with the arcuate flexibility characteristic facing the drum with the said band being positioned between the blocks and the drum, gripping means pivotably secured to the free end of the articulated member, means for rotating the drum, an articulated member confining means positioned to confine the articulated member against the drum, and said means movable in a drum circumferential direction.

2. The device of claim 1 including an enclosed airtight container with the means for rotating the drum extending outside of the enclosed container and the other elements of the device entirely within the enclosed container.

3. The device of claim 2 including a port in the container directly below the drum and a port in the container directly opposite the drum.

4. The device of claim 2 wherein the container is composed of glass.

5. The device of claim 2 wherein the container is composed of a radioactive shield.